(12) United States Patent
Dilling (10) Patent No.: US 7,618,327 B2
(45) Date of Patent: Nov. 17, 2009

(54) FASTENER WITH FRICTION ENGAGEABLE SURFACE

(75) Inventor: Gary Dilling, Gardner, MA (US)

(73) Assignee: Philips Screw Company, Inc., Wakefield, MA (US)

( * ) Notice: Subject to any disclaimer, the term of this patent is extended or adjusted under 35 U.S.C. 154(b) by 0 days.

(21) Appl. No.: 12/274,504

(22) Filed: Nov. 20, 2008

(65) Prior Publication Data

US 2009/0074536 A1  Mar. 19, 2009

Related U.S. Application Data (60) Continuation of application No. 11/832,812, filed on Aug. 2, 2007, now Pat. No. 7,473,182, and a division of application No. 10/825,633, filed on Apr. 15, 2004, now Pat. No. 7,293,949.

(51) Int. Cl.
  *B21H 3/02* (2006.01)
(52) U.S. Cl. .............................. 470/8; 470/63; 411/409; 411/410
(58) Field of Classification Search ...................... 470/8, 470/9, 60, 63; 411/403, 404, 407, 409, 410
  See application file for complete search history.

(56) References Cited

U.S. PATENT DOCUMENTS

| | | |
|---|---|---|
| 2,066,484 A | 1/1937 | Phillips |
| 2,285,460 A | 6/1942 | Purtell |
| 2,474,994 A | 7/1949 | Tomalis |
| RE23,878 E | 9/1954 | Burdick |
| RE24,878 E | 9/1960 | Smith et al. |
| 3,170,364 A | 2/1965 | Johnson et al. |
| 3,237,506 A | 3/1966 | Muenchinger |
| 3,331,274 A | 7/1967 | Walton |
| 3,673,912 A | 7/1972 | Herr |
| 3,714,017 A | 1/1973 | Stark et al. |
| 3,763,725 A | 10/1973 | Reiland |
| 3,769,194 A | 10/1973 | Haggerty |
| 4,084,478 A | 4/1978 | Simmons |
| 4,171,662 A | 10/1979 | Simone et al. |
| 4,187,892 A | 2/1980 | Simmons |
| 4,287,749 A | 9/1981 | Bachrach et al. |
| 4,333,000 A | 6/1982 | Shimizu |
| 4,457,654 A | 7/1984 | Sygnator |
| 4,459,190 A | 7/1984 | Inoue |
| 4,655,658 A | 4/1987 | Gulistan |
| 4,866,769 A | 9/1989 | Karp |

(Continued)

FOREIGN PATENT DOCUMENTS

GB   2 149 872 A   6/1985

(Continued)

*Primary Examiner*—Edward Tolan
(74) *Attorney, Agent, or Firm*—Perman & Green LLP (57) ABSTRACT

Interference surfaces are constructed on inner transition surfaces between wings of a fastener having a spiral recess. A portion of the transition surface is tapered to provide the interference. A standard driver for a spiral recess will engage the interference surface to create a "stick fit" engagement. The punch is formed using a wire EDM operation to construct tapered surfaces within the die cavity of a hob. The hob is machined down to obtain the desired depth, which is measured up from a gage spot indicative of the sticking point.

4 Claims, 6 Drawing Sheets

U.S. PATENT DOCUMENTS

| | | |
|---|---|---|
| 4,993,289 A | 2/1991 | Parks |
| 5,120,173 A * | 6/1992 | Grady .......................... 411/404 |
| 5,279,190 A | 1/1994 | Goss et al. |
| 5,291,811 A | 3/1994 | Goss |
| 5,598,753 A | 2/1997 | Lee |
| 5,931,706 A | 8/1999 | Bassi |
| 5,957,645 A | 9/1999 | Stacy |
| 6,080,348 A | 6/2000 | Shalkey |
| 6,199,455 B1 | 3/2001 | Wagner |
| 6,234,914 B1 | 5/2001 | Stacy |
| 6,361,258 B1 | 3/2002 | Heesch |
| 6,367,358 B1 | 4/2002 | Stacy |
| 6,575,061 B2 | 6/2003 | Wagner |
| 6,655,888 B2 | 12/2003 | Schultz |
| 6,698,315 B1 | 3/2004 | Wright |
| 6,698,316 B1 | 3/2004 | Wright |
| 6,725,746 B1 | 4/2004 | Wright |
| 6,843,729 B2 | 1/2005 | Hughes |
| 6,890,139 B2 * | 5/2005 | Hughes ...................... 411/403 |
| 6,904,833 B2 | 6/2005 | Wright |
| 7,077,038 B2 | 7/2006 | Toyooka et al. |

FOREIGN PATENT DOCUMENTS

| | | |
|---|---|---|
| JP | 2004-353831 | 12/2004 |

* cited by examiner

FASTENER WITH FRICTION ENGAGEABLE SURFACE

CROSS-REFERENCE TO RELATED APPLICATIONS

This application is a continuation of, claims priority to and the benefit of U.S. application Ser. No. 11/832,812 filed 2 Aug. 2007, now allowed, which is a divisional of, claims priority to and the benefit of U.S. application Ser. No. 10/825,633 filed 15 Apr. 2004, now U.S. Pat. No. 7,293,949, issued 13 Nov. 2007, the disclosures of which are incorporated herein by reference in their entirety.

BACKGROUND OF THE INVENTION

1. Field of the Invention

This application relates in general to drive systems for threaded fasteners, tools for their manufacture, and drivers for applying torque to such fasteners. More specifically this application relates to fasteners that employ winged type drivers. In particular fasteners having a recess that provides spiral driving surfaces.

2. Brief Description of Related Developments

Threaded fasteners commonly used in industrial applications typically are driven by power tools at high speeds and under high torque loads. Such conditions present difficult design considerations, particularly with respect to the drive systems and, more particularly, with threaded fasteners having a driver engageable recess in the fastener head. Ideally, such a drive system should be easily manufactured, both as to recess and head geometry as well as to associated tooling for forming the fastener head and drivers for engaging the recess. The strength of the head of the fastener should not be adversely affected by the recess. The driver should be easily insertable into and easily withdrawn from the recess. The driver and recess, when mated, should distribute the stress loads uniformly to avoid formation of highly localized regions of stress that might result in deformation of the recess, or driver, or both, leading to premature failure of the drive system.

The drive system should resist cam-out of the driver from the recess when the fastener is driven. In many applications, it is very important that the fastener must be capable of withstanding several cycles, as in applications where the fasteners must be removed in order to repair or replace parts or to remove and replace access panels. The fastener drive system ideally should be capable of such repeated cycling, particularly in environments where the recess may become contaminated, painted, corroded or otherwise adversely affected in use. In such environments, it is essential that the drive system maintain driving engagement while applying torque in a removal direction. It may be necessary for the drive system to be capable of applying even higher levels of torque when removing the fastener, as may occur when the fastener is over-torqued during initial assembly, or where corrosion develops at the interface at the engaged threads, or if thermal cycling of the assembled components has placed increased stress on the fastener. Where one or more of these, and other, characteristics may present competing considerations, compromises of one in favor of another may be made.

A variety of recess and driver configurations are in common use, including a number of cross-recesses, such as those described in U.S. Pat. No. 24,878 (Smith et al.); U.S. Pat. No. 3,237,506 (Muenchinger) and U.S. Pat. No. 2,474,994 (Tomalis). Other fastener geometries include multi-lobe geometries of the type described in U.S. Pat. No. 3,763,725 (Reiland) and ribbed drive systems as described in U.S. Pat. No. 4,187,892 (Simmons). Also among the common recess configurations is the Allen system which is essentially a straight walled hexagonally shaped socket receptive to a similarly shaped driver.

With the exception of the ribbed systems, the walls and faces of the driver and recess typically are designed to fit closely with each other in an effort to achieve face-to-face contact of the driving and driven surfaces. With cross-recess fasteners, such face-to-face engagement can occur only, if at all, when the driver is properly aligned and seated within the recess. As a practical matter, however, in order to enable the driver to be inserted into the recess, there necessarily must be some clearance between the two.

The necessity for such clearance is even more critical with recesses having substantially vertical drive walls, as in the Reiland '725 patent and Allen head systems. In all of these systems, the practical result of the necessity for such clearance is that substantial face-to-face, broad area contact between the driver and recess surfaces is seldom achieved, if at all. With most drive systems for threaded fasteners, the driver mates with the recess in the head in a manner that results in point or line contact rather than face-to-face broad area contact. The actual area of contact typically is substantially less than full face-to-face contact. Consequently, when torque is applied by the driver, the forces applied to the screw head tend to be concentrated in localized areas with resulting high localized stresses. Such localized high stress can plastically deform the recess, forming ramps or other deformations resulting in premature, unintended disengagement of the driver from the recess. The foregoing difficulties have been recognized in the art. For example, U.S. Pat. No. 2,248,695 (Bradshaw) discloses a screw head and driver arrangement in which the driving and driven faces of the driver and fastener, respectively, are curved and located eccentrically with respect to the screw axis. In the Bradshaw fastener, any "suitable curvature" such as circular or log spiral may be used as long as it is oriented to bind or lock together by frictional engagement. Notwithstanding Bradshaw's teachings, later fastener drive systems, as those referred to above, do not appear to have adopted the Bradshaw teaching of relying on frictional engagement.

A drive system for maximizing the engageable surface area between the driver and recess is described in U.S. Pat. No. 5,957,645, which is commonly owned with the subject application. The disclosure of the '645 patent is incorporated in this application by reference. The recess and driver of the '645 patent are constructed with spirally configured engaging surfaces.

The advantages of the invention described in the '645 patent are achieved by configuring the driving and driven surfaces of the driver and fastener, respectively, to conform to a segment of a spiral and, particularly, in a spiral configuration that enables a substantial and generous clearance between the driver and the recess during insertion and removal of the driver but in which the fully seated driver is permitted to rotate to take up that clearance. The spiral configurations of the drive walls of the driver and the driver-engageable walls of the recess are such that when the spiral walls engage, they do so over a relatively broad area thereby applying and distributing the stress over that broad area. The spirally configured driving and driven walls are oriented to direct a major portion of the applied torque substantially normal to the fastener radius with little, if any, reliance on frictional, near-tangential engagement.

In many applications in which a spirally configured drive system is used, the driver may be power driven or required to be inserted in locations of limited access. In such situations, there is a need to releasably engage the fastener on the driver in advance of installation so that the driver can be used as an insertion tool, as well as a driver. This "stick fit" feature has been attempted in several different types of fasteners, for example, as shown in U.S. Pat. Nos. 6,199,455; 4,457,654; and 4,084,478.

In the '478 patent a series of ribs 26 are inserted in the recess to provide the interference fit. In the '654 patent a cap is installed over the screw head, pressed into the recess and a detent, annular ridge 30, is provided in the cap to engage the driver. In the modified square drive fastener of the '455 patent, adjoining outer walls 17 and 23 are tapered to provide a stick fit feature. The surfaces 17 and 23 are selected for their larger area relative to driving surfaces 14.

The "stick fit" feature allows the fastener to be releasably engaged on the driver to enable manipulation of the driver and fastener as a unit in hard to reach, automated, and other applications. Once installed, the fastener and driver may be disengaged with minimal effort.

The '645 patent indicates that the a positive draft may be formed in the installation, removal, and other surfaces of the recess. Although it isn't clear from the description, such a draft may be for the purpose of facilitating the engagement of the driver in the recess or providing a degree of latitude for the driver orientation other than straight axial alignment. There is no indication that such a draft would be used for the purpose of providing a "stick fit" feature on this type of fastener. In fact the suggested draft of up to 6 degrees, is far in excess of what would be needed and would significantly interfere with the purpose of the spiral installation surface, which is namely to provide engagement of the driver and fastener along an extended surface area as opposed to the tangential engagement of other drive systems. It is therefore needed to provide a suitable means of providing a stick fit feature on a spirally configured fastener.

SUMMARY OF THE INVENTION

It is the purpose of this invention to provide an interference fit between the driver and fastener in which the recess and driver surfaces engage along a spirally configured surface. In order to accomplish this purpose, the recess is dimensioned as close as possible to the standard spirally configured recess to accommodate currently available drivers. The lobes or wings of the recess are formed with an installation surface and a removal surface. Adjacent wings are separated at the inner radius of the lobe by a transition surface.

To generate an interference fit, the transition surface is constructed with a slight draft of up to 2° in which the distance at the bottom of the recess between opposing transition surfaces is slightly reduced. The standard driver will be insertable in a normal manner up to a predetermined depth after which the reduced dimension will cause an interference with the mating transition surfaces on the driver. This is accomplished, while minimizing any change in dimension across the upper opening of the recess. In this manner a "stick fit" feature is provided without appreciably altering the desired full surface area engagement at the installation surfaces.

BRIEF DESCRIPTION OF THE DRAWINGS

The coupling of this invention is explained in more detail below with reference to the accompanying drawing, in which.

DESCRIPTION OF THE PREFERRED EMBODIMENT(S)

Figure 1:
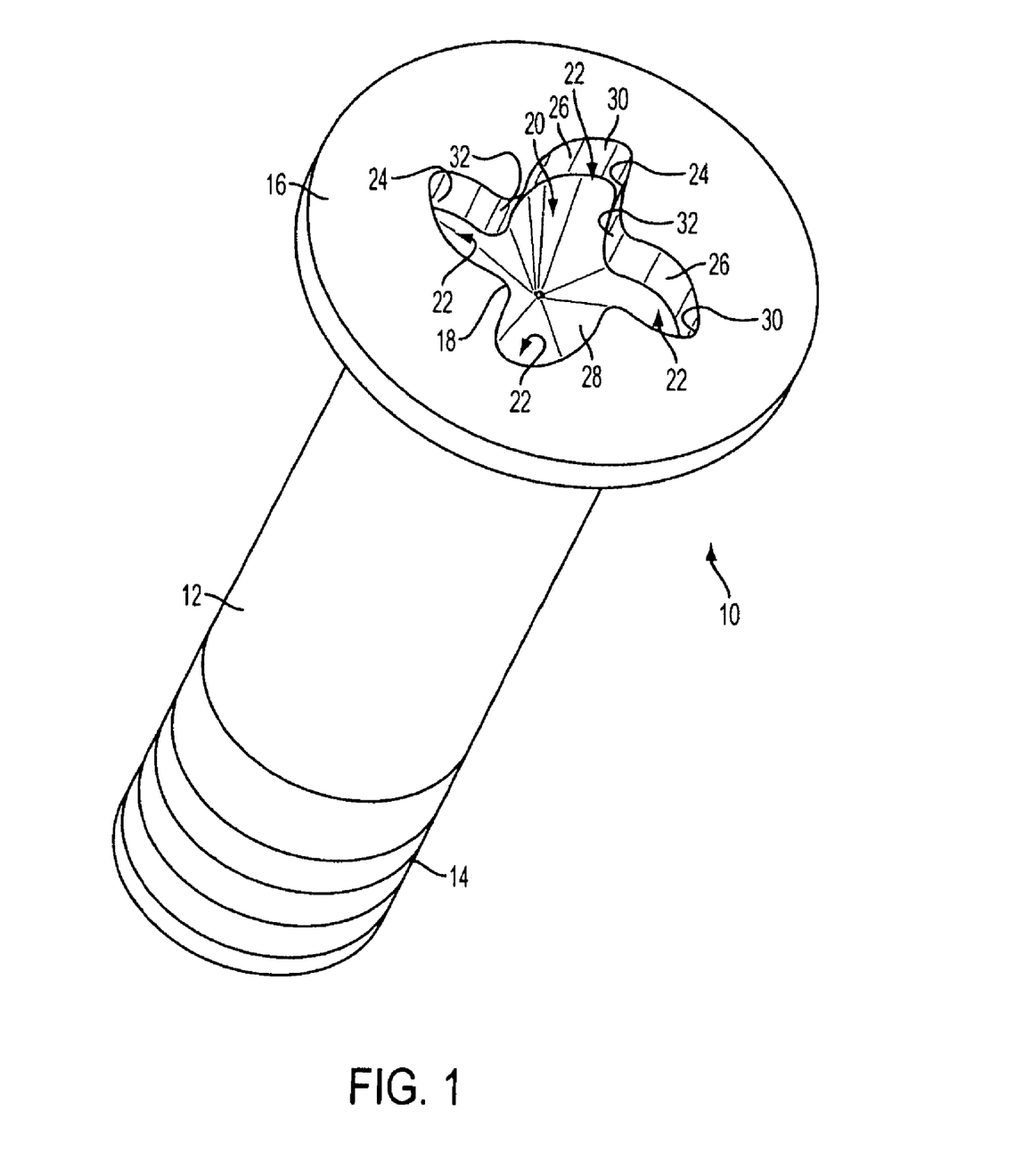
FIG. 1 is perspective view of a flat head screw having a spirally configured recess.

FIG. 1 illustrates an exemplary threaded fastener 10 having a shank 12 with threads 14 formed at one end and a head 16 with a recess 18 formed at the other end. The head 16 may be formed in a conventional two-blow header machine in which the end of the wire or other material from which the fastener is made is supported in a die of the header machine and its head end is impacted, first with a punch that partially forms the head, and then with a finishing punch that finishes the head and forms the driver-engageable recess. The recess 18 is illustrated as having a central portion 20 and a plurality of radially outwardly extending lobes (wings) 22. The recess in the embodiment of FIG. 1 is formed so that each of its wings 22 has an installation wall 24 (assuming a right-handed thread 14) and a removal wall 26. The installation wall 24 and removal wall 26 preferably are formed to be substantially vertical, defining or closely approximating a cylindrical surface parallel to the longitudinal axis of the screw. The bottom of the recess may be defined by a conical bottom wall 28. The radially outer end of each wing may be contoured to provide a smoothly curved transition 30 between the installation wall 24 and removal wall 26 of the wing. The recess also includes an inner transition wall 32 between the installation wall 24 of one wing 22 and the removal wall 26 of the next adjacent wing 22. It should be understood that the invention may be incorporated in threaded fasteners in a wide variety of configurations including recesses having one or more wings in which only one of the installation or removal walls 24, 26 is provided with a spirally contoured segment.

Figure 2:
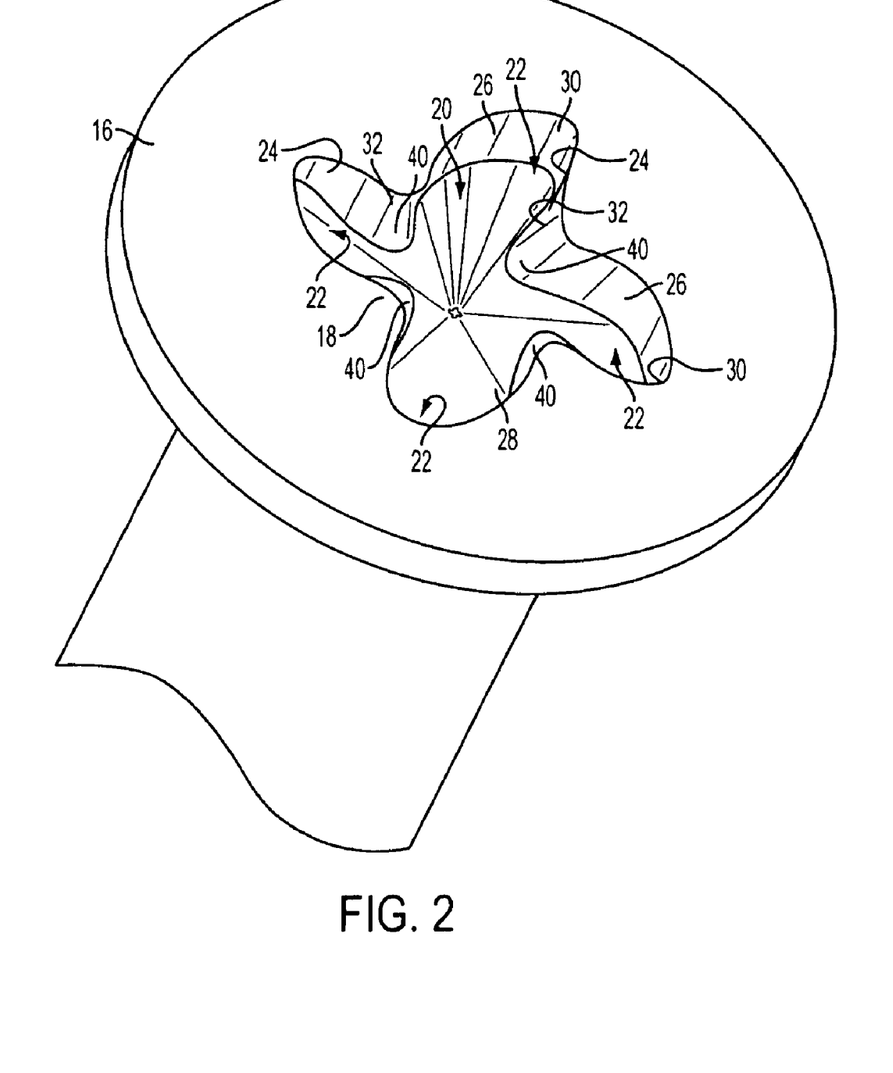
FIG. 2 is a perspective view of a flat head screw having a spirally configured recess modified according to this invention.
Figure 4:
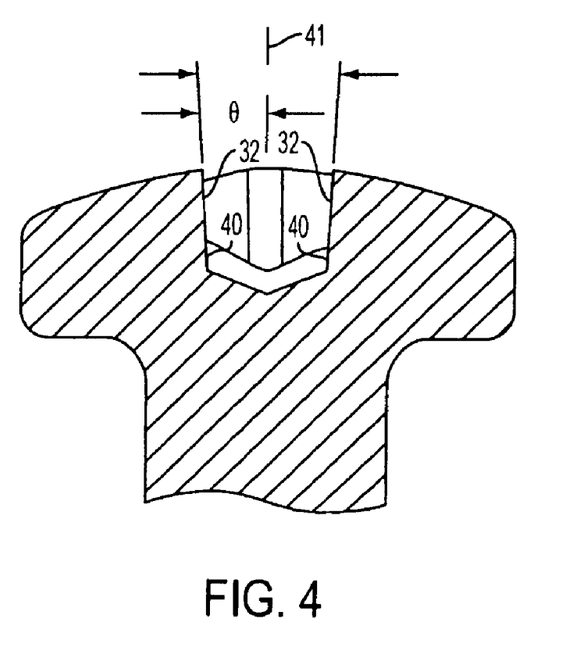
FIG. 4 is a sectional view of the flat head screw of FIG. 2 taken along section lines 4-4 of FIG. 3.

The fastener 20 of this application is shown in FIG. 2 and provides a reliable "stick fit" for receiving a standard spiral driver in an interference fit. "Stick fit is provided by constructing a limited interference surface 40 on the transition surface 32. The interference surface 40 is formed at a draft angle θ in the range of 1°-2° with the axis 41 of the fastener, as shown in FIG. 4.

Figure 3:
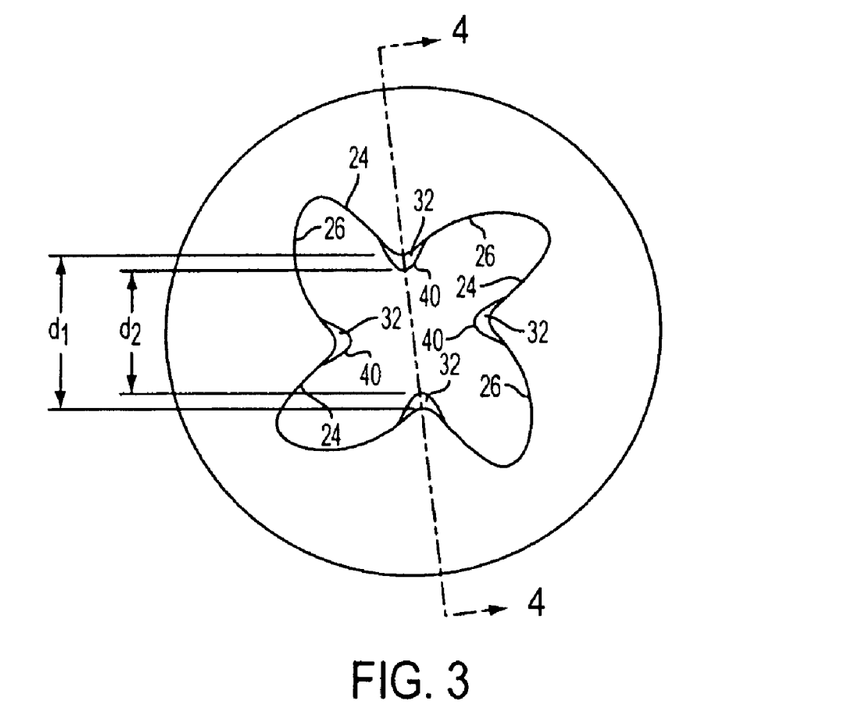
FIG. 3 is a top view of the flat head screw of FIG. 2.

As can be seen in FIG. 3, the opposing interference surfaces 40 will provide opposing tapered surfaces within recess 20 at the lower portions of transition surfaces 32. The recess 20 is constructed having a substantially standard sized opening across the top of the recess of $d_1$, but a reduced size of $d_2$ at the bottom. The interference surface 40 causes an interference fit with a spiral driver, as the driver is fully inserted into the recess 20. Since the interference occurs only when the driver is fully inserted in the recess 20, the "stick fit" feature of this invention does not detract from the surface to surface engagement of installation walls 24 and removal walls 26 with the driving surfaces of the driver.

Figure 5:
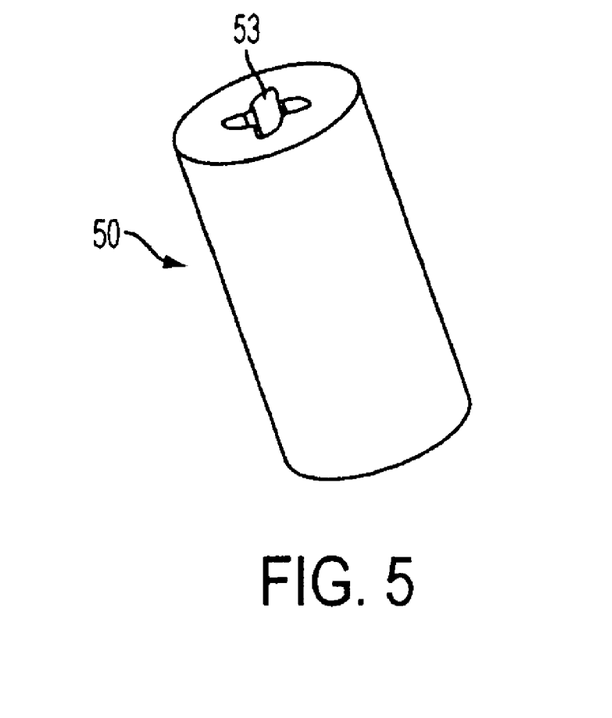
FIG. 5 is a perspective view of a die for forming a punch used in construction the flat head screw of this invention.
Figure 6:
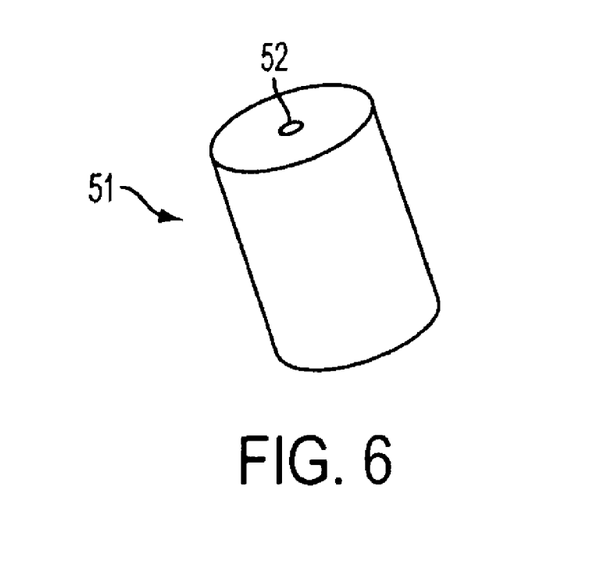
FIG. 6 is a perspective view of a die blank prior to a wire EDM operation.
Figure 7:
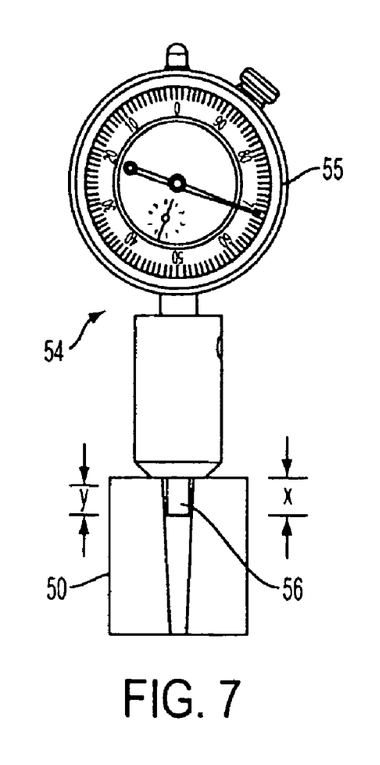
FIG. 7 is a schematic view showing gauging of the die.

In order to manufacture the tapered surfaces 40 on transition surface 32, a wire EDM operation is used to construct a die or hob 50, as shown in FIG. 5, for cold forming a punch from which the recess of this invention can be made. The hob 50 is constructed from a blank 51 of steel bar stock, for example, one inch long by one inch in diameter, that is centerless ground to a tolerance of one inch+0.0005/−0.0000. The ends of the blank need to be parallel and square to the outside diameter. Close tolerances are necessary to ensure a successful wire EDM operation. As shown in FIG. 6, a central bore 52 is drilled axially in the blank 51 at a diameter less than the $d_1$ dimension shown in FIG. 3.

The fully dimensioned and drilled blank 51 is then positioned in a wire EDM fixture with the wire inserted through the bore 52. The wire EDM is programmed to cut out a block of material to form a die cavity 53 in the shape of the punch for the spiral recess, as shown in FIG. 2. To achieve the "stick fit" configuration, the top opening of the cavity, between opposing interference surfaces 40, will be to the dimension $d_1$ and at the bottom opening of the cavity this distance will be to the dimension $d_2$, where $d_1 > d_2$. This tapered configuration is formed only on the transition surfaces 32 to generate the interference surfaces 40.

Figure 8A:
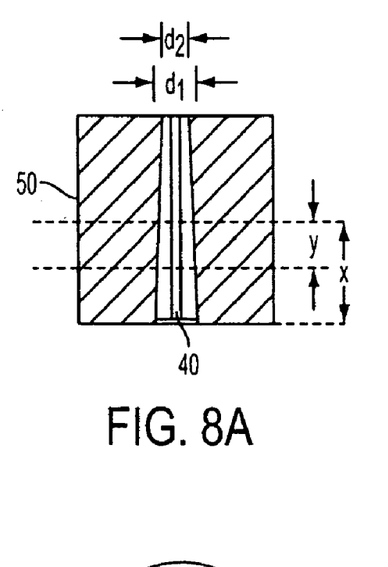
FIGS. 8a and 8b are top and sectional views of the die of FIG. 5.
Figure 8B:
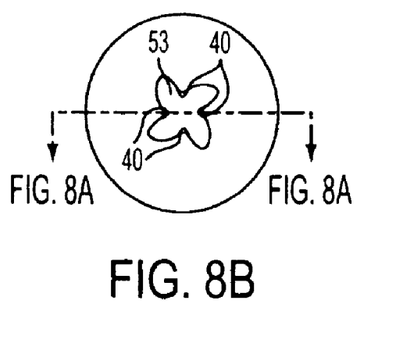
Figure 9A:
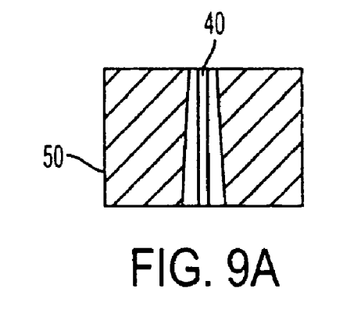
FIGS. 9a and 9b are top and sectional views of the die of FIG. 5 machined to a predetermined depth.
Figure 9B:
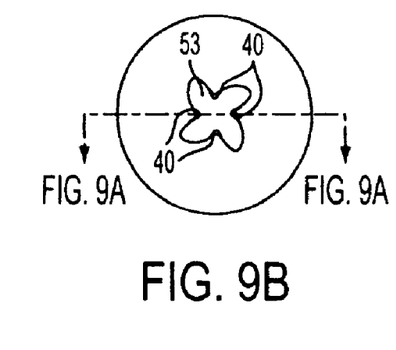
Figure 10:
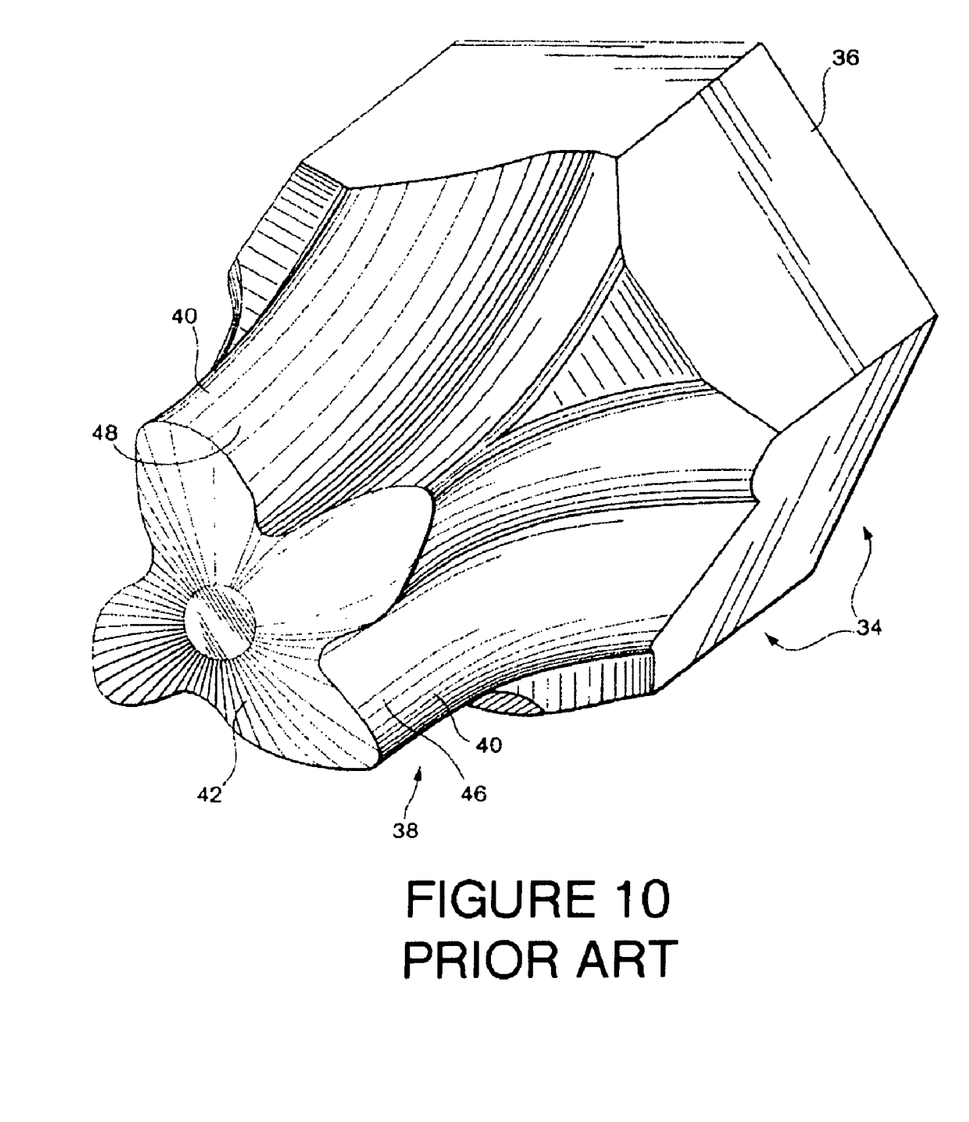
FIG. 10 is a perspective view of a known Prior Art tool.

In order to construct the die cavity 53 of hob 50 to the desired depth for forming a punch (not shown). It is important to locate the sticking point at which the sticking occurs. To locate this gage spot, a specialized gage 54 having a dial 55 and a probe 56 is constructed in which the probe 56 is shaped as a driver for a standard spiral fastener 10, for example, as shown in FIG. 1. Probe 56 is inserted into cavity 53 until interference is indicated on dial 55. This is the depth x of the gage spot and is used as the point from which the depth y of the cavity is determined. The upper face 57 of the hob 50 is then machined to obtain the depth y. This is shown in FIGS. 8 and 9. Once fully dimensioned and machined, hob 50 is hardened and tempered to a hardness level of 60 to 63 on a "C" scale hardness tester. This process permits the reliable construction of multiple hobs having the same dimensions.

A punch is then constructed by pressing the hob 50 in a power press onto a soft steel blank, as is well known in the art.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention, as defined by the claims.

The invention claimed is:

1. A fastener system comprising:
   a fastener constructed with a head and a shank, said shank having a longitudinal axis, and said head constructed having a recess formed at its end, wherein said recess comprises:
   a central portion and a plurality of wings radiating outwardly from the central portion, each of the wings having an installation wall and a removal wall;
   a non-driving transition surface extending between each of the installation and removal walls of adjacent wings, at the radially inner most extent of said wings, each of said transition surfaces formed having an interference surface extending radially inward into the central portion, said surface being tapered from a first distance from the longitudinal axis at a top portion thereof to a second distance from said longitudinal axis at a bottom portion thereof, wherein said first distance is larger than said second distance;
   a driver constructed with driving surfaces shaped to engage the installation and removal walls of the recess, said driver having non-driving surfaces constructed in grooves between said driving surfaces; and
   further wherein said interference contours of said transition surfaces of said recess cooperate to form an interference fit with the non-driving surfaces in the grooves of the driver.

2. The fastener, according to claim 1, wherein said interference surface forms an angle with a line parallel to said longitudinal axis in a range of between 0.5 degrees to 2 degrees.

3. The fastener, according to claim 1, wherein said interference surfaces are constructed to provide an interference fit only at a forward portion of said driver and to allow said driver to have a surface to surface contact with said wings at a rearward portion of said driver.

4. The fastener, according to claim 1, wherein said first distance is constructed substantially according to a standard recess opening of a spiral type recess.

* * * * *

UNITED STATES PATENT AND TRADEMARK OFFICE
CERTIFICATE OF CORRECTION

PATENT NO. : 7,618,327 B2
APPLICATION NO. : 12/274504
DATED : November 17, 2009
INVENTOR(S) : Gary Dilling It is certified that error appears in the above-identified patent and that said Letters Patent is hereby corrected as shown below:

Title page, item (73), should read as follows:

-- Assignee: Phillips Screw Company
Burlington, MA (US) --.

Column 6, line 33, claim 2, change "0.5degrees" to -- 0.5 degrees --.

Signed and Sealed this

First Day of June, 2010

David J. Kappos
*Director of the United States Patent and Trademark Office*